United States Patent [19]

Lew

[11] Patent Number: 4,520,995

[45] Date of Patent: Jun. 4, 1985

[54] DISHED DISC FREE-DISC BUTTERFLY VALVE

[76] Inventor: Hyok S. Lew, 7890 Oak St., Arvada, Colo. 80005

[21] Appl. No.: 413,531

[22] Filed: Aug. 31, 1982

[51] Int. Cl.³ .............................................. F16K 1/22
[52] U.S. Cl. .................................... 251/162; 251/188; 251/308
[58] Field of Search ................ 251/305, 88, 306, 307, 251/308, 162, 163, 188

[56] References Cited

U.S. PATENT DOCUMENTS 3,327,732 6/1967 Deve .................................... 251/305
3,601,364 8/1971 Scaramucci ......................... 251/306
3,627,259 12/1971 Williams .............................. 251/188

Primary Examiner—Martin P. Schwadron
Assistant Examiner—James R. Shay

[57] ABSTRACT

This invention relates to the dished discs employed in the construction of the free-disc or floating disc butterfly valves wherein the disc pivotably disposed in the valve body to block the fluid passage is shaped like a dish. The valve stem is mechanically connected to the convex side of the dished disc substantially near the center. The central axis of the valve stem substantially passes through the center of a hypothetical sphere that substantially includes the rim surface of said dished disc and the surface of the seat disposed in the valve body.

4 Claims, 4 Drawing Figures

DISHED DISC FREE-DISC BUTTERFLY VALVE

The free-disc butterfly valves wherein the disc can be pressed onto the spherital seat included in the valve body for the sure closure and can be floated away from the valve seat for the easy frictionless rotation of the disc provide a definite advantage over the conventional butterfly valves in that the free-disc butterfly valves provides the air-tight closure even with the ring seal disposed around the rim of the valve disc made of hard material such as Teflon and in that it provides a long trouble-free life because of the complete elimination of the wear on the ring seal as the result of floating the disc prior to the rotation in opening and closing action. One disadvantage of the free-disc butterfly valves is the higher pressure drop across the valve due to the larger cross section area of the free-disc that generally includes a dossal structure affixed to the face of the disc which is used to connect the disc to the valve stem.

The primary object of the present invention is to provide a dished discs usable in conjunction with the free-disc butterfly valves, that is connected directly to the valve stem without any dossal structure.

Another object of the present invention is to provide the dished disc that drastically reduces the pressure drop across the free-disc valve.

A further object of the present invention is to provide the dished discs which are light-weight and inexpensive to manufacture.

These and other objects of the present invention will become clear as the description of the present invention proceeds. The present invention may be described with a great clarity and specificity by referring to the following Figures.

Figure 1:
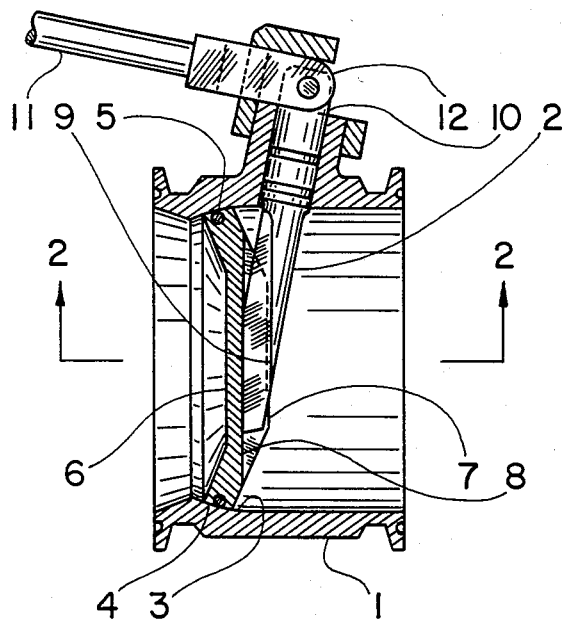
FIG. 1 illustrates a cross section of a dished disc installed in a free-disc butterfly valve.

There is shown In FIG. 1 a cross section of a free-disc butterfly valve including a dished disc, which cross section is taken along a plane including the central axis of the fluid passage through the valve body 1 and the central axis of the valve stem 2. The central axis of the stem 2 intersects the central axis of the fluid passage in an oblique angle and substantially passes through the center of a hypothetical spherical surface substantially including the surface of the spherical seat 3 included in the valve body 1 and the rim surface 4 with a resilient ring seal 5 of the dished disc 6. The dished disc 6 has the rim 4 engaging the spherical seat 3 when the dished disc is rotated to the fully closed position. The central portion 7 of the dished disc 6 is dished away from the base substantially including the rim of the dished disc. The flat convex side central face 7 of the dished disc 6 opposite from the base including the rim 4 includes retaining slide groove such as a female dove-tail groove 8 of which center line passes through the central axis of the dished disc, which rataining slide groove 8 is slidably engaged by a matching slide rail 9 included in the angled end face of the inner extremity of the stem 2 wherein the only possible relative movement between the dished disc 6 and the valve stem 2 is the sliding movement on a plane including the central axis of the stem 2 in a direction substantially perpendicular to the central axis of the dished disc while all relative angular movement therebetween about any axis is prohibited. The outer extremity 10 of the stem 2 includes a handle 11 with a cam system 12 which is used for pulling out and pushing in the valve stem 2 over a small distance as well as to rotate the dished disc to open and close. It is not difficult to realize that a small amount of an axial movement of the valve stem 2 in the outward direction from the valve body 1 floats the dished disc 6 away from the spherical valve seat 3 for an easy and frictionless rotation, while another small amount of the axial movement of the stem 2 in the inward direction into the valve body 1 presses the dished disc onto the spherical seat 3 for a sure closure. It should be mentioned that the dished disc 6 can be easily machined to the finished shape by using the modern computer controlled machining center from a bar stock or forged disc.

Figure 2:
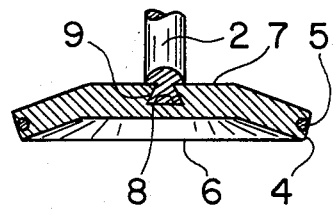
FIG. 2 illustrates another cross section of the dished disc shown in FIG. 1 taken along a plane 2—2 as shown in FIG. 1.

In FIG. 2 there is shown another cross section of the dished disc 6 included in the free-disc butterfly valve shown in FIG. 1, which cross section is taken along a plane 2—2 as illustrated in FIG. 1. When the dished disc 6 is rotated to the fully open position in the valve, the direction of the fluid flow is substantially parallel to the plane of the drawing and substantially perpendicular to the stem 2. It is easy to notice that the dished disc 6 is of a well streamlined cross section and, consequently, has a low drag coefficient against the stream moving in afore-mentioned direction resulting in a lower pressure drop across the free-disc valve with the dished disc 6. FIG. 2 further illustrates the advantage in connecting the dished disc 6 to the stem 2 in a sliding relationship by means of a retaining slide joint such as the dove-tail joint including the grooves 8 and 9.

Figure 3:
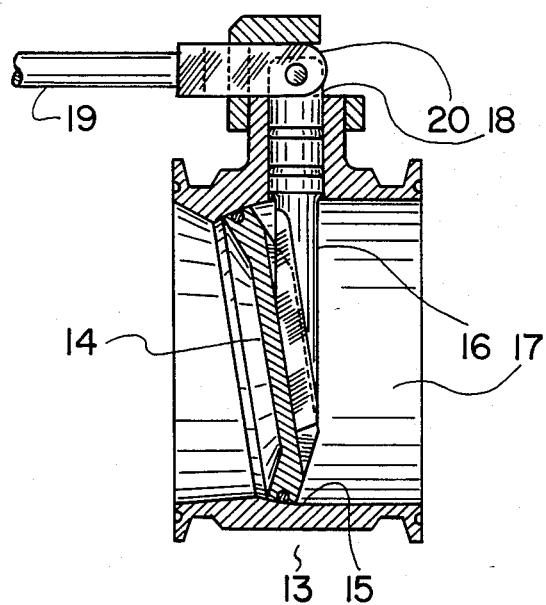
FIG. 3 illustrates a cross section of a dished disc installed in another free-disc butterfly valve.

In FIG. 3 there is illustrated a cross section of another free-disc valve 13 including a dished disc 14 having essentially the same construction as the dished disc 6 of FIG. 1 and connected to the valve stem 16 in the same manner as the case in FIG. 1 with the exception that the spherical seat 15 is disposed on a plane angled to the central axis of the fluid passage 17 and the stem 16 is installed substantially perpendicular to the central axis of the fluid passage 17. The outer extremity 18 of the stem 16 includes a handle 19 with the cam 20. The free-disc butterfly valve 13 operates in the same principle as that explained in conjunction with FIG. 1.

Figure 4:
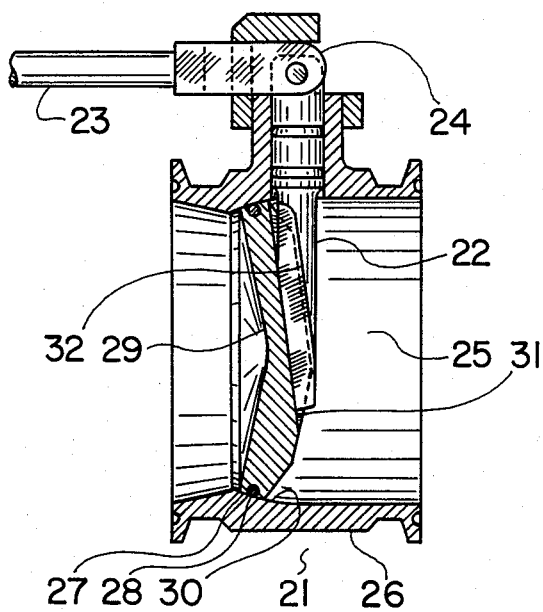
FIG. 4 illustrates another dished disc installed in a further free-disc butterfly valve.

In FIG. 4, there is shown a cross section of a further free-disc valve 21 including another dished disc 29 of different embodiment, which dished disc is slidably connected to the stem 22 with a handle 23 and a cam 24 wherein the stem 22 is installed substantially perpendicular to the central axis of the fluid passage 25 through the valve body 26. When the dished disc is rotated to the fully closed position of the valve, the rim 27 with a resilient ring seal 28 engages the spherical seat 30 included in the valve body 26 on a plane substantially perpendicular to the central axis of the fluid passage 25. The convex side of the dished disc 29 includes a retaining slide groove such as a female dove-tail groove 31 dispoed on a radial plane in an oblique angle with respect to the central axis of the dished disc 29, which retaining slide groove 31 is slidably engaged by the matching slide rail 32 included in the angled end face of the inner extremity of the stem 22. The free-disc valve 21 operates in the same principle as described in conjunction with FIG. 1.

While the principles of the present invention have now been made clear by the illustrative embodiments, there will be immediately obvious to the skilled in the art many modifications of the structures, elements, proportions, arrangement and materials which are particularly adapted to the specific working environment and operating condition in the practice of the invention without departing from the principles of the present invention.

I claim:

1. A free-disc butterfly valve comprising in combination: a valve body with fluid passage having an inner surface including an annular seat disposed on a plane substantially perpendicular to the central axis of said fluid passage whrein said annular seat substantially coincides with a spherical surface with center substantially coinciding with the central axis of said fluid passage; a stem disposed in an oblique angle with respect to the central axis of said fluid passage, said stem extending through one wall of said valve body rotatably and slidably in a leak-proof manner wherein the center-line of said stem substantially passes through the center of said spherical surface and the inner extremity of said stem includes a retaining slide rail disposed in an oblique angle with respect to the center-line of said stem on a plane substantially including the center-line of said stem; and a dished disc pivotably disposed within said fluid passage adjacent to said annular seat having a rim substantially conforming with said annular seat when said dished disc is rotated to the fully closed position and having a central portion dished away from a plane including said rim toward the center of said spherical surface, said dished disc slidably connected to the inner extremity of said stem by means of said retaining slide rail engaging a retaining slide groove disposed in the convex side of said central portion of said dished disc on a plane substantially parallel to a plane including said rim of said dished disc; whereby, a small amount of axial movement of said stem in one direction relieves the seating pressure between said annular seat and said rim of said dished disc and a small amount of axial movement of said stem in the other direction opposite to said one direction establishes said seating pressure.

2. The combination as set forth in claim 1 wherein a resilient annular seal is disposed on the rim of said dished disc.

3. The combination as set forth in claim 1 wherein said combination includes means for rotating said stem about the center-line of said stem and means for moving said stem over a small distance in axial directions.

4. The combination as set forth in claim 2 wherein said combination includes means for rotating said stem about the center-line of said stem and means for moving said stem over a small distance in axial directions.

* * * * *